(12) United States Patent
Frederiksen et al.

(10) Patent No.: US 10,103,848 B2
(45) Date of Patent: Oct. 16, 2018

(54) HYBRID AUTOMATIC REPEAT REQUEST TIMING IN COMMUNICATIONS

(71) Applicant: Nokia Solutions and Networks Oy, Espoo (FI)

(72) Inventors: Frank Frederiksen, Aalborg (DK); Esa Tapani Tiirola, Kempele (FI)

(73) Assignee: Nokia Solutions and Networks Oy, Espoo (FI)

( * ) Notice: Subject to any disclaimer, the term of this patent is extended or adjusted under 35 U.S.C. 154(b) by 50 days.

(21) Appl. No.: 15/301,704

(22) PCT Filed: Apr. 4, 2014

(86) PCT No.: PCT/EP2014/056776
§ 371 (c)(1),
(2) Date: Oct. 3, 2016

(87) PCT Pub. No.: WO2015/149862
PCT Pub. Date: Oct. 8, 2015

(65) Prior Publication Data
US 2017/0117992 A1 Apr. 27, 2017

(51) Int. Cl.
*H04L 1/18* (2006.01)
*H04W 28/04* (2009.01)
(Continued)

(52) U.S. Cl.
CPC .......... *H04L 1/1887* (2013.01); *H04L 1/1812* (2013.01); *H04L 1/1822* (2013.01);
(Continued)

(58) Field of Classification Search
CPC ... H04L 1/1822; H04L 1/1887; H04L 1/1896; H04L 1/1812; H04W 72/1284
(Continued)

(56) References Cited

U.S. PATENT DOCUMENTS

| | | | |
|---|---|---|---|
| 8,284,754 B2 * | 10/2012 | Chang | H04L 1/1607 370/350 |
| 8,804,640 B2 * | 8/2014 | Ke | H04L 1/1812 370/329 |

(Continued)

FOREIGN PATENT DOCUMENTS

| | | |
|---|---|---|
| EP | 2306665 A1 | 4/2011 |
| JP | 2005-323366 A | 11/2005 |

(Continued)

OTHER PUBLICATIONS

International Search Report received for corresponding Patent Cooperation Treaty Application No. PCT/EP2014/056776, dated Dec. 18, 2014, 4 pages.

(Continued)

*Primary Examiner* — Man U Phan
(74) *Attorney, Agent, or Firm* — Nokia Technologies Oy

(57) ABSTRACT

A method is disclosed comprising defining a hybrid automatic repeat request HARQ profile for a user terminal among a plurality of HARQ profiles available. In an embodiment, the HARQ profile indicates a first time interval between downlink transmission being received in the terminal and corresponding uplink control information being expected to be transmitted from the terminal, and a second time interval between the uplink control information being transmitted from the terminal and corresponding downlink retransmission at earliest being expected to be received in the terminal. In another embodiment, the HARQ profile indicates a third time interval between uplink transmission being received in a base station and corresponding downlink information being expected to be transmitted from the base station, and a fourth time interval between the downlink information being transmitted from the base station and
(Continued)

corresponding uplink retransmission at earliest being expected to be received in the base station.

20 Claims, 7 Drawing Sheets

(51) Int. Cl.
*H04W 72/04* (2009.01)
*H04W 72/12* (2009.01)

(52) U.S. Cl.
CPC .......... *H04L 1/1896* (2013.01); *H04W 28/04* (2013.01); *H04W 72/04* (2013.01); *H04W 72/1284* (2013.01)

(58) Field of Classification Search
USPC .......... 370/315–329, 348–468; 455/452–502
See application file for complete search history.

(56) References Cited

U.S. PATENT DOCUMENTS

| | | | |
|---|---|---|---|
| 8,831,034 B2* | 9/2014 | Tynderfeldt | H04W 56/0045 370/232 |
| 8,989,082 B2* | 3/2015 | Wigard | H04W 48/10 370/319 |
| 9,131,456 B2* | 9/2015 | Niwano | H04W 52/346 |
| 9,363,049 B2* | 6/2016 | Li | H04L 1/1822 |
| 9,414,378 B2* | 8/2016 | Stanze | H04L 1/1887 |
| 9,801,161 B2* | 10/2017 | Marinier | H04L 5/0007 |
| 9,843,365 B2* | 12/2017 | Pelletier | H04B 7/0417 |
| 2007/0041349 A1* | 2/2007 | Kim | H04L 1/1671 370/335 |
| 2012/0269180 A1 | 10/2012 | Li et al. | |
| 2014/0092788 A1 | 4/2014 | Ji | |
| 2015/0172023 A1* | 6/2015 | Yang | H04L 1/1671 370/329 |

FOREIGN PATENT DOCUMENTS

| | | |
|---|---|---|
| JP | 2009-206846 A | 9/2009 |
| JP | 2013-506367 A | 2/2013 |
| WO | 2009031866 A2 | 3/2003 |
| WO | 2013/123980 A1 | 8/2013 |

OTHER PUBLICATIONS

"Text Proposal for section 5.3 of 3GPP TR 36.888", 3GPP TSG RAN WG1 Meeting #68, R1-120925, Agenda: 7.7, Vodafone Group, Feb. 6-10, 2012, pp. 1-4.

"3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321, V12.0.0, Dec. 2013, pp. 1-57.

"Dynamic Frequency Scaling", Wikipedia, Retrieved on Apr. 10, 2018, Webpage available at : https://en.wikipedia.org/wiki/Dynamic_frequency_scaling.

Office action received for corresponding Japanese Patent Application No. 2016-560656, dated Oct. 17, 2017, 6 pages of office action and 12 pages of Translation available.

"Text proposal on Coverage Improvement for Low-Cost MTC UEs", 3GPP TSG RAN WG1 Meeting #72, R1-130054, Agenda: 7.3.4, CATT, Jan. 28-Feb. 1, 2013, pp. 1-5.

"S-UMTS Coverage Analysis for E-DCH Voice", 3GPP TSG RAN WG1 Meeting #74bis, R1-134694, Agenda: 6.4.5, Huawei, Oct. 7-11, 2013, pp. 1-5.

Office action received for corresponding European Patent Application No. 14715588.1, dated May 2, 2018, 6 pages.

Office action received for corresponding Japanese Patent Application No. 2016-560656, dated Jul. 24, 2018, 4 pages of office action and 8 pages of Translation available.

* cited by examiner

HYBRID AUTOMATIC REPEAT REQUEST TIMING IN COMMUNICATIONS

RELATED APPLICATION

This application was originally filed as Patent Cooperation Treaty Application No. PCT/EP2014/056776 filed Apr. 4, 2014.

FIELD OF THE INVENTION

The exemplary and non-limiting embodiments of this invention relate generally to wireless communications networks, and more particularly to transmission control.

BACKGROUND ART

The following description of background art may include insights, discoveries, understandings or disclosures, or associations together with dis-closures not known to the relevant art prior to the present invention but provided by the invention. Some such contributions of the invention may be specifically pointed out below, whereas other such contributions of the invention will be apparent from their context.

Dynamic frequency scaling (also known as CPU throttling) is a technique whereby the frequency of a microprocessor may be automatically adjusted "on the fly" either to conserve power or to reduce the amount of heat generated by the chip. Dynamic frequency scaling is commonly used in laptops and other mobile devices, where energy comes from a battery and thus is limited. It is also used in quiet computing settings and to decrease energy and cooling costs for lightly loaded machines. Less heat output, in turn, allows the system cooling fans to be throttled down or turned off, reducing noise levels, and further decreasing power consumption. It is also used for reducing heat in insufficiently cooled systems when the temperature reaches a certain threshold. Due to static power consumption and asymptotic execution time the energy consumption of a piece of software shows convex energy behaviour, i.e. there is an optimal CPU frequency at which the energy consumption is minimal. Leakage current has become more and more important as transistor sizes have become smaller and threshold voltage levels lower. Dynamic frequency scaling reduces the number of instructions a processor is able to issue in a given period of time, thus reducing performance.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Various aspects of the invention comprise methods, an apparatus, and a computer program product as defined in the independent claims. Further embodiments of the invention are disclosed in the dependent claims.

An aspect of the invention relates to a method for transmission control in a communications system, the method comprising defining, in a network apparatus, a hybrid automatic repeat request profile for a user terminal among a plurality of hybrid automatic repeat request profiles available, wherein the hybrid automatic repeat request profile indicates a first time interval between downlink transmission being received in the user terminal and corresponding uplink control information being expected to be transmitted from the user terminal, and a second time interval between the uplink control information being transmitted from the user terminal and corresponding downlink retransmission at earliest being expected to be received in the user terminal.

A further aspect of the invention relates to a method for transmission control in a communications system, the method comprising defining, in a network apparatus, a hybrid automatic repeat request profile for a user terminal among a plurality of hybrid automatic repeat request profiles available, wherein the hybrid automatic repeat request profile indicates a third time interval between uplink transmission being received in a base station and corresponding downlink information being expected to be transmitted from the base station, and a fourth time interval between the downlink information being transmitted from the base station and corresponding uplink retransmission at earliest being expected to be received in the base station.

A still further aspect of the invention relates to an apparatus comprising at least one processor; and at least one memory including a computer program code, wherein the at least one memory and the computer program code are configured to, with the at least one processor, cause the apparatus to perform any of the method steps.

A still further aspect of the invention relates to a computer program product comprising program code means configured to perform any of the method steps when the program is run on a computer.

Although the various aspects, embodiments and features of the invention are recited independently, it should be appreciated that all combinations of the various aspects, embodiments and features of the invention are possible and within the scope of the present invention as claimed.

BRIEF DESCRIPTION OF THE DRAWINGS

In the following the invention will be described in greater detail by means of exemplary embodiments with reference to the attached drawings, in which.

DETAILED DESCRIPTION OF SOME EMBODIMENTS

Figure 1:
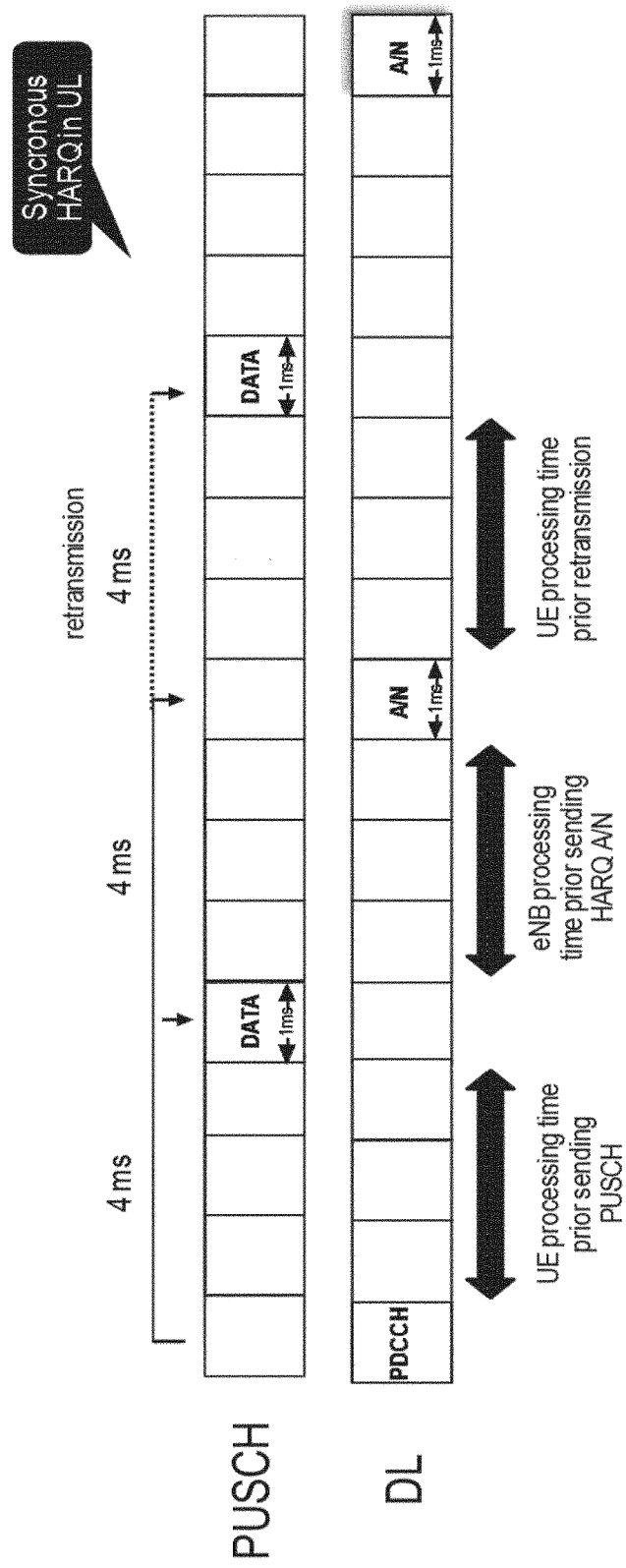
FIG. 1 illustrates a timing relationship in synchronous LTE UL.

An exemplary embodiment is related to next generation wireless systems such as future evolutions of LTE-advanced, or future generations of completely new wireless systems. An exemplary embodiment is related to HARQ (hybrid automatic repeat request) operation which is used in existing cellular wireless communication system to allow for high spectral efficiency, as HARQ provides protection against packet transmission errors. Such transmission/reception errors typically happen either due to erroneous channel information, changed channel conditions, or just aggressive link adaptation, where the scheduling unit pushes a modulation and coding scheme used to a limit to get the maximum throughput possible.

In existing versions of modern wireless communication standards such as LTE and HSPA, there is a strong dependence on dynamically scheduled transmissions of user plane data. This means that a base station (called eNB in 3GPP LTE) first sends a downlink control information (DCI) message to a user equipment (UE). This DCI includes a resource allocation message (information on physical resources used, modulation and coding scheme, HARQ information—a process ID and whether new data is present or not, etc.) for a downlink direction, and an uplink grant for a case where UE is expected to perform uplink transmissions. Here the uplink grant contains information on the physical resources to be used, the modulation and coding scheme, HARQ related information, and a specific sequence of reference symbols to be used for demodulation of data). Each regular scheduling decision for both uplink and downlink are controlled by eNB. To enable the most efficient operation, there is a very strict timing relationship regarding when particular things are supposed to happen within the system. There is typically a fixed relation between the scheduling grant, transmission of data, transmission of HARQ feedback, and the earliest possible retransmission time. These fixed timing relations have been introduced to have near-optimum operation of the system. Using the fixed timing relations provide a possibility to fill a pipeline with data such that each UE may potentially have continuous data transmission/reception, but also to allow for efficient and implicit resource allocation for feedback channels (such as PUCCH based uplink channels and PHICH downlink channels).

Using a fixed and predefined timing structure for the communication system is setting some processing time requirements on a node that is receiving the data.

Air interface latency (i.e. HARQ timing) also has a considerable cost impact. For example, it defines the size of a HARQ buffer. The more relaxed latency, the more data buffering is needed (reduced HARQ timing may lead to an increased cost due to the data buffering). Furthermore, over-dimensioned processing times also increase the length of a data call at least in some MTC scenarios, and this has a negative impact on UE power consumption. On the other hand, in the case of the highest data rates/highest load, a baseband processing capability of UE and/or eNB may be a limiting factor in reducing the latency. In these cases there might be no room for reducing the air interface latency. For the sake of varying requirements, the fixed HARQ timing approach is not appropriate for the coming communication systems.

Regarding the HARQ operation in LTE (downlink HARQ operation and uplink HARQ operation), the existing systems have been considering the fixed timing relations for transmission, feedback, and potentially a new retransmission.

FIG. 1 illustrates the timing relationship in synchronous LTE UL (FDD mode) where stop-and-wait HARQ is applied with 8 parallel HARQ processes.

In terms of processing power capabilities, the 3GPP systems have allowed for some differentiation, as there are some UE capabilities that have fewer HARQ buffers, but the timing requirements for these capability classes are still fixed and defined from standards.

The concept of dynamic frequency scaling is related to "throttling" a processor speed to adjust the processing power to the current need.

Further, from a power consumption point of view, it is better to calculate slowly and be ready just in time compared to calculating fast and wait for applying the result.

On the other hand, to minimize the "on-time" of a modem part of a transceiver it is typically most power efficient to convey the data as fast as possible.

An exemplary embodiment enables introducing variable HARQ feedback timing and operation in wireless systems.

In an exemplary embodiment, different mobile units (i.e. user equipment UE) may have different processing time requirements depending e.g. on the conditions that UEs experience.

In an exemplary embodiment, a concept of flexible HARQ timing is introduce within the wireless systems. There are a number of ways that this principle may be implemented. An exemplary principle is to allow for flexibility in the HARQ timing such that UE or eNB may have more (or less) time to do the actual processing of the data in both ends of the communication link. For example, a time interval between UE receiving the downlink transmission and UE being expected to provide the related uplink control information (ack/nack in the uplink) may be configurable (or defined during initial access to a cell). Correspondingly, the time that eNB has to process the uplink control information until UE at earliest expects retransmission may be configurable. The same principles may be applied for the uplink scheduling (here with configurable delays between scheduling grant, uplink transmission, downlink retransmission indication, and the potential retransmission).

In an exemplary embodiment, different (configuration) options with different HARQ timing profiles are made available for communication involving (at least) two nodes, wherein each HARQ-timing profile has pre-defined processing times defined for data and control processing at both ends of the communication link. These options may be used e.g. such that one device category (e.g. MTC/low data rate devices) applies one HARQ timing profile whereas another device type (e.g. data centric UE) applies another HARQ timing profile. The applied HARQ timing profile may also depend on a cell and/or service type. The different HARQ timing profiles may or may not involve a different number of HARQ processes.

In an exemplary embodiment, multiple HARQ-timing profiles coexist in a common resource space containing frequency and time resources.

An exemplary approach of operating HARQ may introduce significant changes to the way that a HARQ control loop is typically considered. On the other hand, it allows for the different UEs to operate in different ways. In an extreme case, some very low power UEs (such as MTC devices) that may be running at an extremely low power consumption and may have limited processing cycles available per second, may be operating in the same system as high processing power capable devices with ultra-fast responses. In that case eNB or an access point may have more book-keeping to make sure that there are no collisions on the control channels (data channels may be multiplexed e.g. based on frequency domain multiplexing).

In an exemplary embodiment, the difference in HARQ loop timing is defined through UE capability classes, such that the system may include fast response capable UEs and some UEs that have a lower HARQ loop delay capability.

In an exemplary embodiment, it is possible to reconfigure the HARQ loop delay dynamically during an active session in case some conditions change in UE (or in the network).

In an exemplary embodiment, the different HARQ loop timings are defined as "powers of two" of each other, such that each delay in the HARQ delay loop is multiplied with two, four, eight or sixteen. In this way it is relatively easy for the book-keeping to scale according to the different HARQ processes. It is also possible to define separate (HARQ-ACK) control channel portions in the shared control channel for UEs having different HARQ timing profiles.

In an exemplary embodiment, it may be possible for eNB (or a similar controlling device) to force UE to operate with a loop delay longer than UE is inherently operating (to make the operation of each UE in the network be similar).

In an exemplary embodiment, signaling of the loop delay may be either explicit (i.e. direct signaling towards impacted UEs) or implicit (i.e. derived from certain conditions in the network).

In an exemplary embodiment, an applied HARQ timing profile may be configured via system information. The applied HARQ timing profile may be made a cell specific parameter common to each UE. It is also possible to make the configuration separately for different UE classes, or to apply dedicated higher layer signaling to configure the applied HARQ timing profile in an UE-specific manner.

Figure 2:
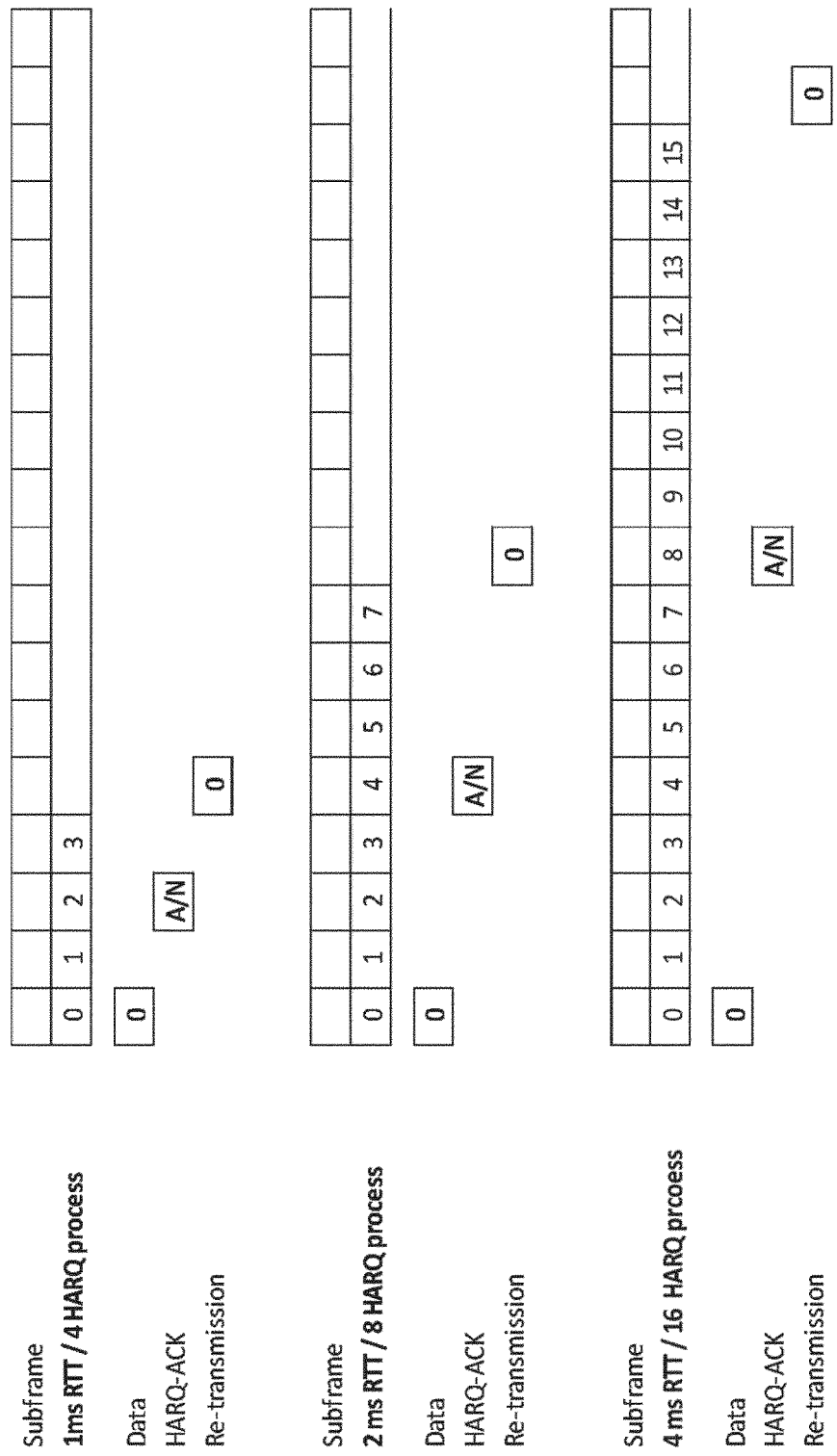
FIG. 2 illustrates exemplary HARQ timing profiles with a variable number of HARQ processes.

FIG. 2 illustrates the different HARQ timing profiles with a variable number of HARQ processes. In an exemplary situation shown in FIG. 2, a subframe length equals to 0.25 ms. FIG. 2 illustrates an exemplary operation mode where the number of HARQ processes scales linearly with the loop delay (meaning that UE is still able to use each TTI for transmission). Each case corresponds to a different HARQ timing profile. As seen from FIG. 2, the first operation mode has a very short round trip time (RRT) of 1 ms for each signaling option (for the generation of an ack/nack signal) and for eNB processing of the scheduling for a potential retransmission. In the other two operation modes, it is seen that RRT has been increased by a factor 2 or 4 to allow for a larger delay—both for the generation of the ack/nack signal and for the retransmission scheduling decision. It is noted that in this approach, the number of the HARQ processes is scaled accordingly to allow for continuous transmission to this UE. When the HARQ timing profile is changed for UE (according to FIG. 2) it means that the size of the HARQ buffer per subframe is also varied according to the applied HARQ timing profile.

Figure 3:
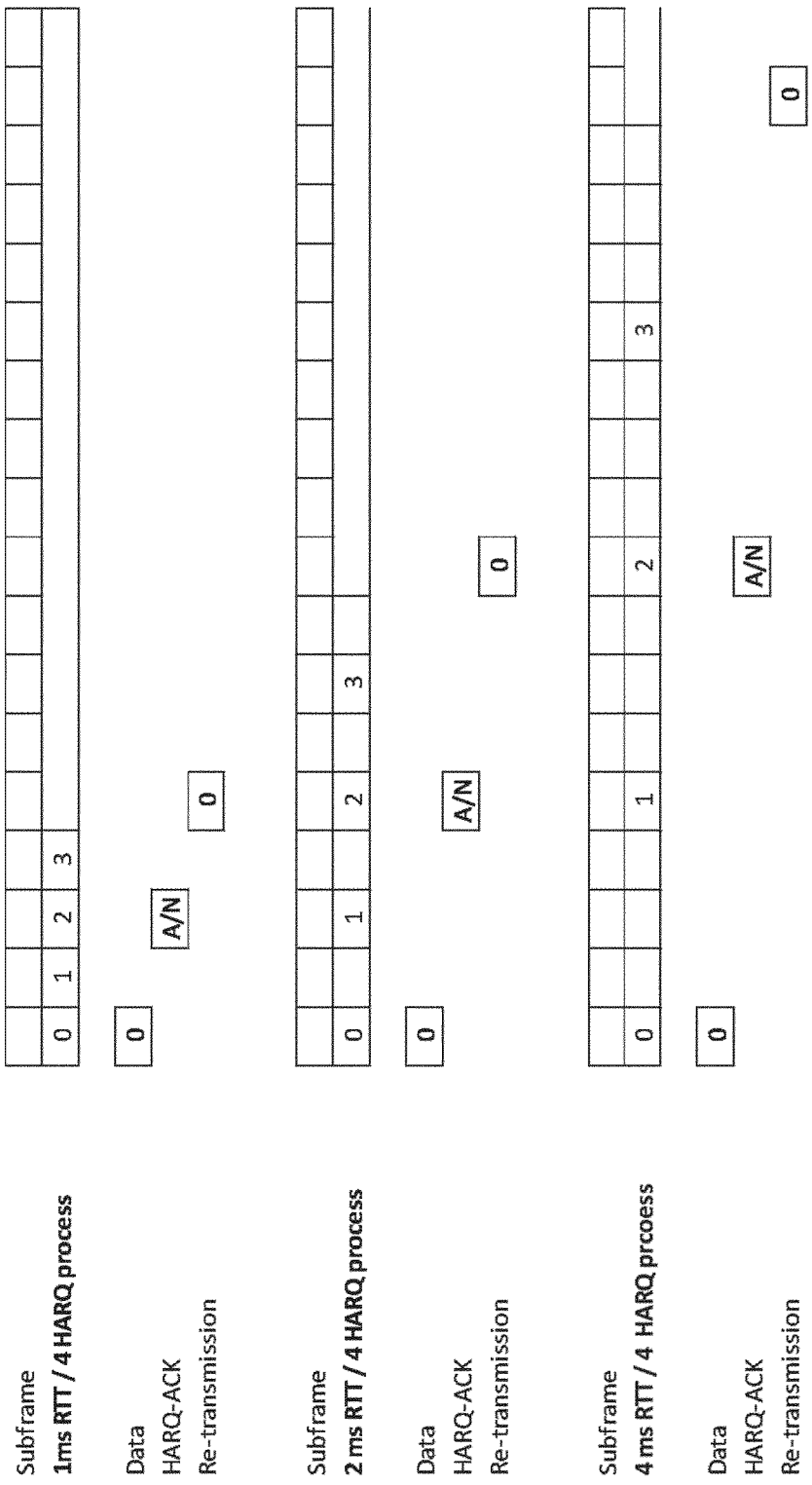
FIG. 3 illustrates exemplary HARQ timing profiles with a fixed number of HARQ processes.

FIG. 3 illustrates the different HARQ timing profiles with a fixed number of HARQ processes. In an exemplary situation shown in FIG. 3, a subframe length equals to 0.25 ms. FIG. 3 illustrates an exemplary operation mode where the operation mode may involve a fixed number of HARQ processes—meaning that when increasing the HARQ loop delay, UE also accepts that it is not scheduled in each available TTI (which makes sense in the way that UE is operating at a reduced processing power anyway), and hence the size of the memory for each HARQ process remains the same. Another option is to combine an increased HARQ loop delay with a variable TTI length (not shown in FIG. 3). In that embodiment, the TTI length increases with an increased round trip time (RTT). For example, the TTI length may be 0.25 ms with 1 ms RTT; 0.5 ms with 2 ms RTT; and 2 ms with 4 ms RTT, respectively. An exemplary embodiment may be based on multiplying by factors of 2; however, it should be noted that this is only for illustration purposes and the selection of time adjustment for the processing time may vary by arbitrary numbers for both the receiving end and for the transmitting end.

An exemplary embodiment enables optimizing cost/complexity and performance (throughput, latency, power consumption) separately for different use cases and UE classes. An exemplary embodiment enables multiplexing UEs having different HARQ timing profiles in use.

Exemplary embodiments of the present invention will now be de-scribed more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Like reference numerals refer to like elements throughout.

The present invention is applicable to any user terminal, server, corresponding component, and/or to any communication system or any combination of different communication systems that support hybrid automatic repeat request operation. The communication system may be a fixed communication system or a wireless communication system or a communication system utilizing both fixed networks and wireless networks. The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, the embodiment.

In the following, different embodiments will be described using, as an example of a system architecture whereto the embodiments may be ap-plied, an architecture based on LTE-A network elements, without restricting the embodiment to such an architecture, however. The embodiments described in these examples are not limited to the LTE-A radio systems but can also be implemented in other radio systems, such as UMTS (universal mobile telecommunications system), GSM, EDGE, WCDMA, bluetooth network, WLAN or other fixed, mobile or wireless network. In an embodiment, the presented solution may be applied between elements belonging to different but compatible systems such as LTE and UMTS.

Figure 4:
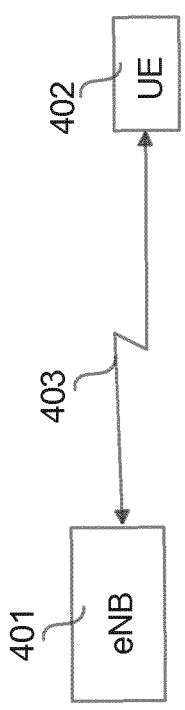
FIG. 4 shows a simplified block diagram illustrating exemplary system architecture.

A general architecture of a communication system is illustrated in FIG. 4. FIG. 4 is a simplified system architecture only showing some elements and functional entities, all being logical units whose implementation may differ from what is shown. The connections shown in FIG. 4 are logical connections; the actual physical connections may be different. It is apparent to a person skilled in the art that the systems also comprise other functions and structures. It should be appreciated that the functions, structures, elements and the protocols used in or for hybrid automatic repeat request operation, are irrelevant to the actual invention. Therefore, they need not to be discussed in more detail here.

The exemplary radio system of FIG. 4 comprises a network node 401 of a network operator. The network node 401 may include e.g. an LTE-A base station eNB of a cell, radio network controller (RNC), or any other network element, or a combination of network elements. The network node 401 may be connected to one or more core network (CN) elements (not shown in FIG. 4) such as a mobile switching centre (MSC), MSC server (MSS), mobility management entity (MME), serving gateway (SGW), gateway GPRS support node (GGSN), serving GPRS support node (SGSN), home location register (HLR), home subscriber server (HSS), visitor location register (VLR). In FIG. 4, the radio network node 401 that may also be called eNB (enhanced node-B, evolved node-B) or network apparatus of the radio system, hosts the functions for radio resource management in the second cell of a public land mobile network.

FIG. 4 shows a user equipment 402 located in the service area of the radio network node 401. The user equipment refers to a portable computing device, and it may also be referred to as a user terminal. Such computing devices include wireless mobile communication devices operating with or without a subscriber identification module (SIM) in hardware or in soft-ware, including, but not limited to, the following types of devices: mobile phone, smart-phone, personal digital assistant (PDA), handset, laptop computer. In the example situation of FIG. 4, the user equipment 402 is capable of connecting to the radio network node 401 via a (cellular radio) connection 403, respectively.

Figure 5:
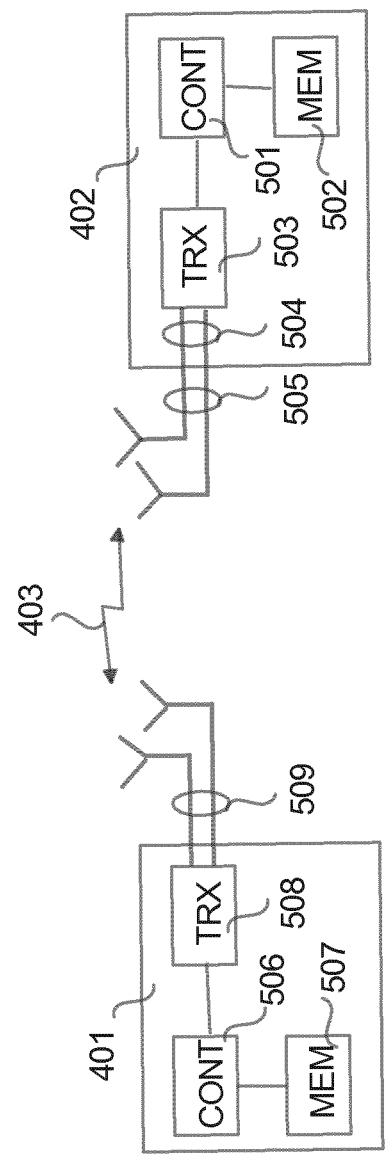
FIG. 5 shows a simplified block diagram illustrating exemplary apparatuses.

FIG. 5 is a block diagram of an apparatus according to an embodiment of the invention. FIG. 5 shows a user equipment 402 located in the area of a radio network node 401. The user equipment 402 is configured to be in connection 403 with the radio network node 401. The user equipment or UE 402 comprises a controller 501 operationally connected to a memory 502 and a transceiver 503. The controller 501 controls the operation of the user equipment 402. The memory 502 is configured to store software and data. The transceiver 503 is configured to set up and maintain a wireless connection 403 to the radio network node 401, respectively. The transceiver 503 is operationally connected to a set of antenna ports 504 connected to an antenna arrangement 505. The antenna arrangement 505 may comprise a set of antennas. The number of antennas may be one to four, for example. The number of antennas is not limited to any particular number. The user equipment 402 may also comprise various other components, such as a user interface, camera, and media player. They are not displayed in the figure due to simplicity.

The radio network node 401, such as an LTE-A (or beyond LTE-A) base station (eNode-B, eNB) comprises a controller 506 operationally connected to a memory 507, and a transceiver 508. The controller 506 controls the operation of the radio network node 401. The memory 507 is configured to store software and data. The transceiver 508 is configured to set up and maintain a wireless connection to the user equipment 402 within the service area of the radio network node 401. The transceiver 508 is operationally connected to an antenna arrangement 509. The antenna arrangement 509 may comprise a set of antennas. The number of antennas may be two to four, for example. The number of antennas is not limited to any particular number. The radio network node 401 may be operationally connected (directly or indirectly) to another network element of the communication system, such as a further radio network node, radio network controller (RNC), a mobility management entity (MME), a serving gateway (SGW), an MSC server (MSS), a mobile switching centre (MSC), a radio resource management (RRM) node, an operations, administrations and maintenance (OAM) node, a home location register (HLR), a visitor location register (VLR), a serving GPRS support node, a gateway, and/or a server, via an interface (not shown in FIG. 5). The embodiments are not, however, restricted to the network given above as an example, but a person skilled in the art may apply the solution to other communication networks provided with the necessary properties. For example, the connections between different network elements may be realized with internet protocol (IP) connections.

Although the apparatus 401, 402 has been depicted as one entity, different modules and memory may be implemented in one or more physical or logical entities. The apparatus may also be a user terminal which is a piece of equipment or a device that associates, or is arranged to associate, the user terminal and its user with a subscription and allows a user to interact with a communications system. The user terminal presents information to the user and allows the user to input information. In other words, the user terminal may be any terminal capable of receiving information from and/or transmitting information to the network, connectable to the network wirelessly or via a fixed connection. Examples of the user terminals include a personal computer, a game console, a laptop (a notebook), a personal digital assistant, a mobile station (mobile phone), a smart phone, and a line telephone.

The apparatus 401, 402 may generally include a processor, controller, control unit or the like connected to a memory and to various inter-faces of the apparatus. Generally the processor is a central processing unit, but the processor may be an additional operation processor. The processor may comprise a computer processor, application-specific integrated circuit (ASIC), field-programmable gate array (FPGA), and/or other hardware components that have been programmed in such a way to carry out one or more functions of an embodiment.

The memory 502, 507 may include volatile and/or non-volatile memory and typically stores content, data, or the like. For example, the memory 502, 507 may store computer program code such as software applications or operating systems, information, data, content, or the like for a processor to perform steps associated with operation of the apparatus in accordance with embodiments. The memory may be, for example, random access memory (RAM), a hard drive, or other fixed data memory or storage device. Further, the memory, or part of it, may be removable memory detachably connected to the apparatus.

The techniques described herein may be implemented by various means so that an apparatus implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g. procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

Figure 6:
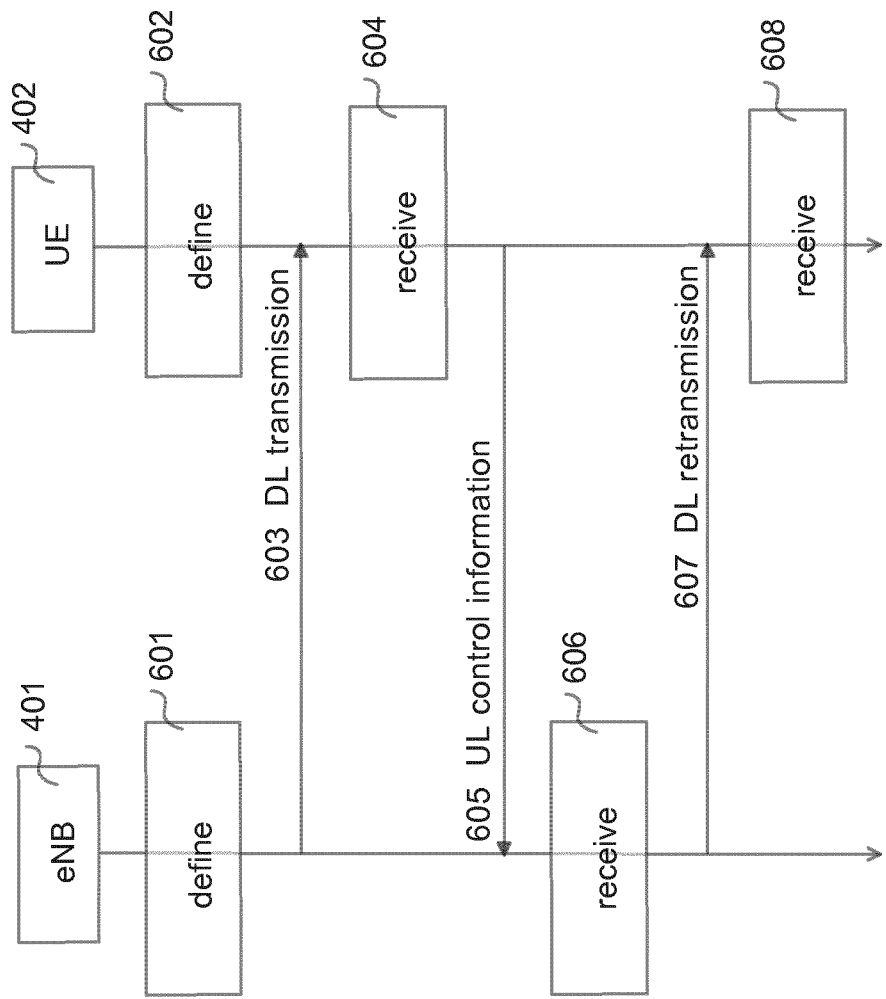
FIGS. 6 and 7 show a messaging diagram illustrating an exemplary messaging event according to an embodiment of the invention.

The signalling chart of FIG. 6 illustrates the required signalling. In the example of FIG. 6, an apparatus 401, which may comprise e.g. a network element (network node (scheduling node), e.g. a LTE-A-capable base station (enhanced node-B, eNB)) may, in item 601, define a hybrid automatic repeat request profile for a user terminal 402. Alternatively or addition to that the hybrid automatic repeat request profile for the user terminal 402 may be defined in the user terminal 402 in item 602 (or in any other suitable network node). In item 603, downlink transmission may be transmitted from the base station 401 to the user terminal. In item 604, the downlink transmission is received in the user terminal 402. In item 605, uplink control information is transmitted from the user terminal 402 to the base station 401. In item 606, the uplink control information is received in the base station 401. In item 607, downlink retransmission may be transmitted from the base station 401 to the user terminal 402. In item 608, the downlink retransmission is received in the user terminal 402. According an exemplary embodiment, the hybrid automatic repeat request profile (downlink HARQ profile) indicates a first time interval between the downlink transmission being received in the user terminal 402 and the corresponding uplink control information being expected to be transmitted from the user terminal 402, and a second time interval between the uplink control information being transmitted from the user terminal 402 and the corresponding downlink retransmission at earliest being expected to be received in the user terminal 402.

Figure 7:
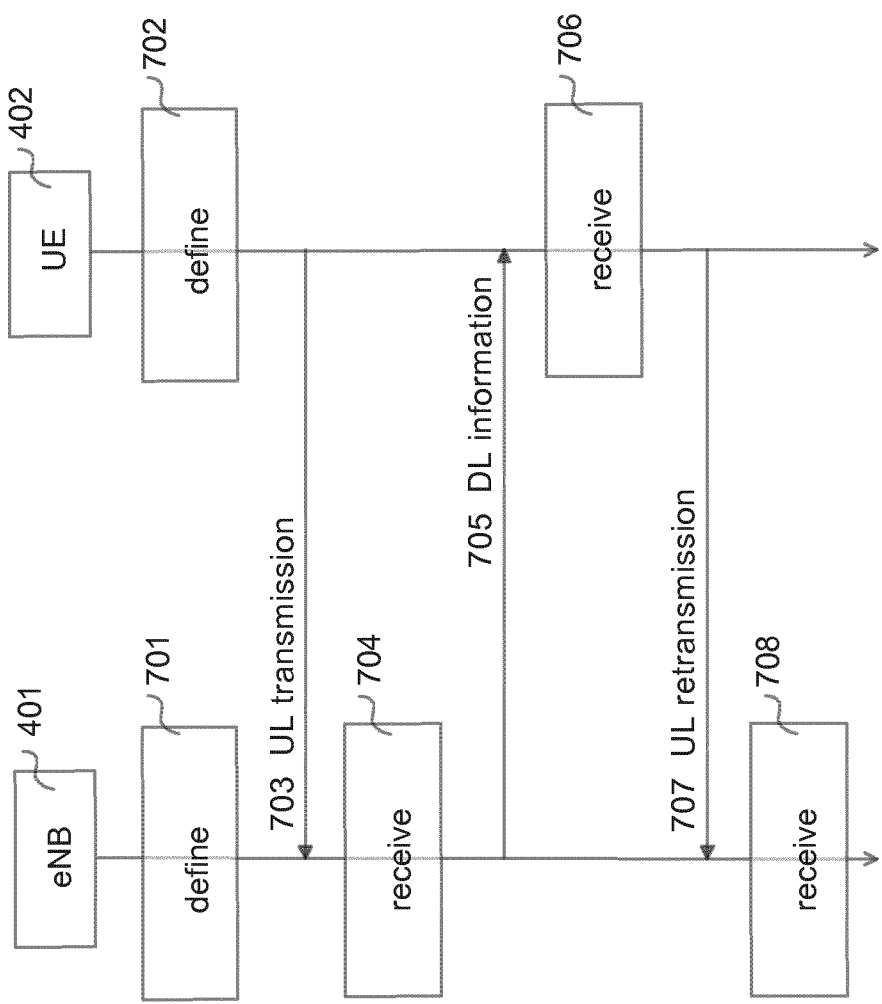

The signalling chart of FIG. 7 illustrates the required signalling. In the example of FIG. 7, an apparatus 401, which may comprise e.g. a network element (network node (scheduling node), e.g. a LTE-A-capable base station (enhanced node-B, eNB)) may, in item 701, define a hybrid automatic repeat request profile for a user terminal 402. Alternatively or addition to that the hybrid automatic repeat request profile for the user terminal 402 may be defined in the user terminal 402 in item 702 (or in any other suitable network node). In item 703, uplink transmission may be transmitted from the user terminal 402 to the base station 401. In item 704, the uplink transmission is received in the base station 401. In item 705, downlink information is transmitted from the base station 401 to the user terminal 402. In item 706, the downlink information is received in the user terminal 402. In item 707, uplink retransmission may be transmitted from the user terminal 402 to the base station 401. In item 708, the uplink retransmission is received in the base station 401. According an exemplary embodiment, the hybrid automatic repeat request profile (uplink HARQ profile) indicates a third time interval between the uplink transmission being received in the base station 401 and the corresponding downlink information being expected to be transmitted from the base station 401, and a fourth time interval between the downlink information being transmitted from the base station 401 and the corresponding uplink retransmission at earliest being expected to be received in the base station 401.

Figure 8:
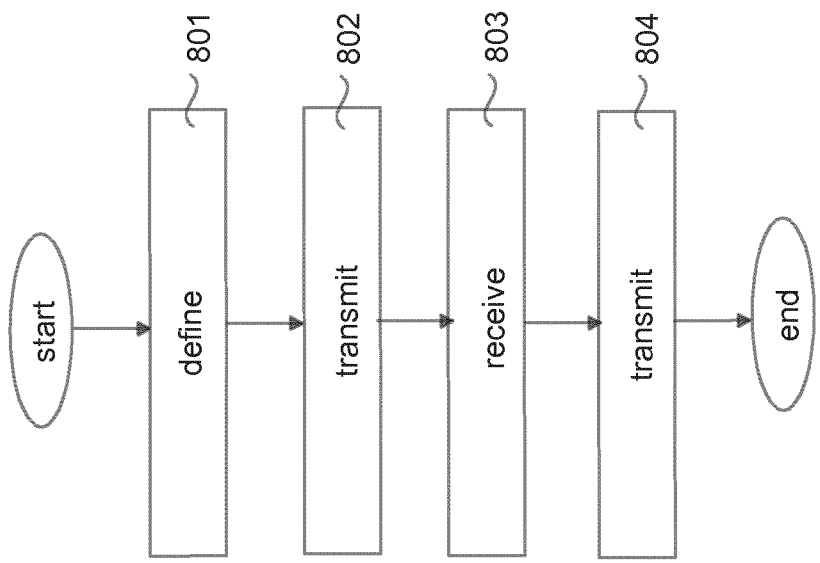

FIG. 8 is a flow chart illustrating an exemplary embodiment. The apparatus 401, 402, which may comprise e.g. a network element (network node (scheduling node), e.g. a LTE-A-capable base station (enhanced node-B, eNB), or a communication node (user terminal, UE)) may, in item 801, define a hybrid automatic repeat request profile for the user terminal 402.

In item 802, downlink transmission may be transmitted from the base station 401 to the user terminal. In item 803, uplink control information is received in the base station 401 from the user terminal 402. In item 804, downlink retransmission may be transmitted from the base station 401 to the user terminal 402. According an exemplary embodiment, the hybrid automatic repeat request profile indicates a first time interval between the downlink transmission being received in the user terminal 402 and the corresponding uplink control information being expected to be transmitted from the user terminal 402, and a second time interval between the uplink control information being transmitted from the user terminal 402 and the corresponding downlink retransmission at earliest being expected to be received in the user terminal 402.

Another option is that, in item 802, uplink transmission may be transmitted from the user terminal 402 to the base station 401. In item 803, downlink information is received in the user terminal 402 from the base station 401. In item 804, uplink retransmission may be transmitted from the user terminal 402 to the base station 401. According an exemplary embodiment, the hybrid automatic repeat request profile indicates a third time interval between the uplink transmission being received in the base station 401 and the corresponding downlink information being expected to be transmitted from the base station 401, and a fourth time interval between the downlink information being transmitted from the base station 401 and the corresponding uplink retransmission at earliest being expected to be received in the base station 401.

Figure 9:
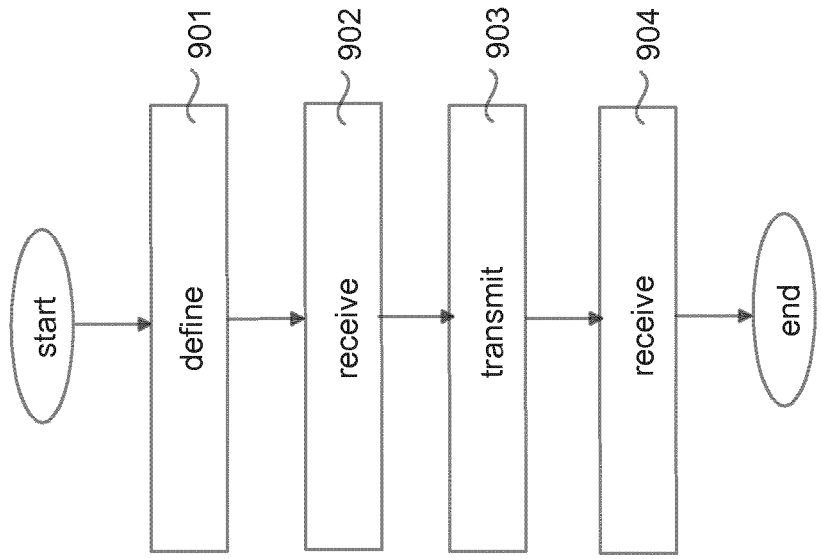
FIGS. 8 and 9 show a schematic diagram of a flow chart according to an exemplary embodiment of the invention.

FIG. 9 is a flow chart illustrating an exemplary embodiment. The apparatus 401, 402, which may comprise e.g. a network element (network node (scheduling node), e.g. a LTE-A-capable base station (enhanced node-B, eNB), or a communication node (user terminal, UE)) may, in item 901, define a hybrid automatic repeat request profile for the user terminal 402.

In item 902, downlink transmission is received in the user terminal 402 from the base station 401. In item 903, uplink control information is transmitted from the user terminal 402 to the base station 401. In item 904, downlink retransmission is received in the user terminal 402 from the base station 401. According an exemplary embodiment, the hybrid automatic repeat request profile indicates a first time interval between the downlink transmission being received in the user terminal 402 and the corresponding uplink control information being expected to be transmitted from the user terminal 402, and a second time interval between the uplink control information being transmitted from the user terminal 402 and the corresponding downlink retransmission at earliest being expected to be received in the user terminal 402.

Another option is that, in item 902, uplink transmission is received in the base station 401 from the user terminal 402. In item 903, downlink information is transmitted from the base station 401 to the user terminal 402. In item 904, uplink retransmission is received in the base station 401 from the user terminal 402. According an exemplary embodiment, the hybrid automatic repeat request profile indicates a third time interval between the uplink transmission being received in the base station 401 and the corresponding downlink information being expected to be transmitted from the base station 401, and a fourth time interval between the downlink information being transmitted from the base station 401 and the corresponding uplink retransmission at earliest being expected to be received in the base station 401.

In an exemplary embodiment, the hybrid automatic repeat request profile is predefined or defined during initial access to a cell.

In another exemplary embodiment, flexible HARQ timing is provided by adjusting the time reserved for processing data and related control signals in the system. The processing may include receiver processing (control or data) and/or transmitter processing (data or control).

In yet another exemplary embodiment, at least one of the uplink control information and the downlink information comprises an acknowledgement message or a negative acknowledgement message.

In yet another exemplary embodiment, the uplink transmission comprises an uplink message, such as an uplink scheduled message.

In yet another exemplary embodiment, the downlink information comprises an uplink scheduling grant message.

In yet another exemplary embodiment, the HARQ timing profile is device specific (user terminal specific), device type specific, cell specific and/or service type specific.

In yet another exemplary embodiment, a variable or fixed number of different HARQ processes involved in the HARQ timing profile is defined.

In yet another exemplary embodiment, a variable transmission time interval TTI length is defined for different HARQ processes involved in the HARQ profile.

In yet another exemplary embodiment, multiple HARQ timing profiles coexist in a common resource space comprising frequency and time resources.

In yet another exemplary embodiment, HARQ loop timing for the user terminal is defined based on a capability class of the user terminal.

In yet another exemplary embodiment, the user terminal is defined as a fast response capable user terminal or the user terminal is defined as a lower HARQ loop delay capable user terminal.

In yet another exemplary embodiment, in response to predetermined event in the system, a HARQ loop delay is dynamically reconfigured for the user terminal during an active session.

In yet another exemplary embodiment, separate HARQ-ACK control channel portions are defined in a shared control channel for user terminals having different HARQ timing profiles.

In yet another exemplary embodiment, a size of a HARQ buffer per subframe and/or a maximum number of HARQ processes is defined according to the HARQ timing profile.

In yet another exemplary embodiment, a bi-directional HARQ profile is defined for the user terminal, the bi-directional HARQ profile comprising the downlink HARQ profile and the uplink HARQ profile for the user terminal.

In yet another exemplary embodiment, an apparatus is provided comprising at least one processor; and at least one memory including a computer program code, wherein the at least one memory and the computer program code are configured to, with the at least one processor, cause the apparatus to perform a method according to an exemplary embodiment.

The steps/points, signalling messages and related functions de-scribed above in FIGS. 1 to 9 are in no absolute chronological order, and some of the steps/points may be performed simultaneously or in an order differing from the given one. Other functions can also be executed between the steps/points or within the steps/points and other signalling messages sent be-tween the illustrated messages. Some of the steps/points or part of the steps/points can also be left out or replaced by a corresponding step/point or part of the step/point. The apparatus operations illustrate a procedure that may be implemented in one or more physical or logical entities. The signalling messages are only exemplary and may even comprise several separate messages for transmitting the same information. In addition, the messages may also contain other information.

It will be obvious to a person skilled in the art that, as the technology advances, the inventive concept can be implemented in various ways. The invention and its embodiments are not limited to the examples described above but may vary within the scope of the claims.

LIST OF ABBREVIATIONS

3GPP 3rd generation partnership project
LTE long term evolution
UE user equipment
QoS quality of service
HARQ hybrid automatic repeat request
MTC machine type communication
LTE-A long term evolution advanced
HSPA high speed packet access
PUCCH physical uplink control channel
PHICH physical hybrid-ARQ indicator channel
TTI transmission time interval

The invention claimed is:

1. A method for transmission control in a communications system, the method comprising
   defining, in a network apparatus, a capability class of a user terminal to be a fast response capable user terminal or a lower hybrid automatic repeat request loop delay capable user terminal;
   defining, based on the capability class of the user terminal, a hybrid automatic repeat request profile for the user terminal among a plurality of hybrid automatic repeat request profiles available,
   wherein the hybrid automatic repeat request profile indicates
      a first time interval between downlink transmission being received in the user terminal and corresponding uplink control information being expected to be transmitted from the user terminal, and
      a second time interval between the uplink control information being transmitted from the user terminal and corresponding downlink retransmission at earliest being expected to be received in the user terminal;
   or
   wherein the hybrid automatic repeat request profile indicates
      a third time interval between uplink transmission being received in a base station and corresponding downlink information being expected to be transmitted from the base station, and
      a fourth time interval between the downlink information being transmitted from the base station and corresponding uplink retransmission at earliest being expected to be received in the base station;
   and performing or causing performing of a hybrid automatic repeat request process in accordance with the defined hybrid automatic repeat request profile.

2. The method according to claim 1, wherein the hybrid automatic repeat request profile is predefined or defined during initial access to a cell.

3. The method according to claim 1, further comprising providing flexible hybrid automatic repeat request timing by adjusting the time reserved for processing data and related control signals in the system.

4. The method according to claim 1, wherein at least one of the uplink control information and the downlink information comprises an acknowledgement message or a negative acknowledgement message.

5. The method according to claim 1, wherein the uplink transmission comprises an uplink scheduled message.

6. The method according to claim 1, wherein the downlink information comprises an uplink scheduling grant message.

7. The method according to claim 1, wherein the hybrid automatic repeat request profile is one or more of device specific, device type specific, cell specific, and service type specific.

8. The method according to claim 1, further comprising defining a variable or fixed number of different hybrid automatic repeat request processes involved in the hybrid automatic repeat request profile.

9. The method according to claim 1, further comprising defining a variable transmission time interval TTI length for different hybrid automatic repeat request processes involved in the hybrid automatic repeat request profile.

10. The method according to claim 1, wherein multiple hybrid automatic repeat request profiles coexist in a common resource space comprising frequency and time resources.

11. The method according to claim 1, further comprising, in response to predetermined event in the system, reconfiguring a hybrid automatic repeat request loop delay dynamically for the user terminal during an active session.

12. The method according to claim 1, further comprising defining separate HARQ-ACK control channel portions in a shared control channel for user terminals having different hybrid automatic repeat request profiles.

13. The method according to claim 1, further comprising defining at least one of a size of a hybrid automatic repeat request buffer per subframe, and a maximum number of hybrid automatic repeat request processes, according to the hybrid automatic repeat request profile.

14. The method according to claim 1, further comprising defining a bi-directional hybrid automatic repeat request profile for the user terminal, the bi-directional hybrid automatic repeat request profile comprising a downlink hybrid automatic repeat request profile and an uplink hybrid automatic repeat request profile for the user terminal.

15. An apparatus comprising at least one processor; and at least one memory including a computer program code, wherein the at least one memory and the computer program code are configured to, with the at least one processor, cause the apparatus to:
define a capability class of a user terminal to be a fast response capable user terminal or a lower hybrid automatic repeat request loop delay capable user terminal;
define, based on the capability class of the user terminal, a hybrid automatic repeat request profile for the user terminal among a plurality of hybrid automatic repeat request profiles available,
wherein the hybrid automatic repeat request profile indicates
a first time interval between downlink transmission being received in the user terminal and corresponding uplink control information being expected to be transmitted from the user terminal, and
a second time interval between the uplink control information being transmitted from the user terminal and corresponding downlink retransmission at earliest being expected to be received in the user terminal;
or
wherein the hybrid automatic repeat request profile indicates
a third time interval between uplink transmission being received in a base station and corresponding downlink information being expected to be transmitted from the base station, and
a fourth time interval between the downlink information being transmitted from the base station and corresponding uplink retransmission at earliest being expected to be received in the base station;
and wherein the at least one memory and the computer program code are configured to, with the at least one processor, cause at least one of the apparatus and a second apparatus to perform a hybrid automatic repeat request process in accordance with the defined hybrid automatic repeat request profile.

16. A computer program product embodied on a non-transitory distribution medium and comprising program code configured to cause an apparatus to perform the following when the program is run on a computer:
defining a capability class of a user terminal to be a fast response capable user terminal or a lower hybrid automatic repeat request loop delay capable user terminal;
defining, based on the capability class of the user terminal, a hybrid automatic repeat request profile for the user terminal among a plurality of hybrid automatic repeat request profiles available,
wherein the hybrid automatic repeat request profile indicates
a first time interval between downlink transmission being received in the user terminal and corresponding uplink control information being expected to be transmitted from the user terminal, and
a second time interval between the uplink control information being transmitted from the user terminal and corresponding downlink retransmission at earliest being expected to be received in the user terminal;
or
wherein the hybrid automatic repeat request profile indicates
a third time interval between uplink transmission being received in a base station and corresponding downlink information being expected to be transmitted from the base station, and
a fourth time interval between the downlink information being transmitted from the base station and corresponding uplink retransmission at earliest being expected to be received in the base station;
and performing or causing performing of a hybrid automatic repeat request process in accordance with the defined hybrid automatic repeat request profile.

17. The apparatus according to claim 15, wherein the at least one memory and the computer program code are configured, with the at least one processor, to cause the apparatus further to provide flexible hybrid automatic repeat request timing by adjusting the time reserved for processing data and related control signals in the system.

18. The apparatus according to claim 15, wherein the hybrid automatic repeat request profile is one or more of device specific, device type specific, cell specific, and service type specific.

19. The apparatus according to claim 15, wherein the at least one memory and the computer program code are configured, with the at least one processor, to cause the apparatus further to, in response to predetermined event in the system, reconfigure a hybrid automatic repeat request loop delay dynamically for the user terminal during an active session.

20. The apparatus according to claim 15, wherein the at least one memory and the computer program code are configured, with the at least one processor, to cause the apparatus further to define a bi-directional hybrid automatic repeat request profile for the user terminal, the bi-directional hybrid automatic repeat request profile comprising a downlink hybrid automatic repeat request profile and an uplink hybrid automatic repeat request profile for the user terminal.

\* \* \* \* \*